United States Patent
Yanagisawa et al.

(10) Patent No.: US 10,949,470 B2
(45) Date of Patent: Mar. 16, 2021

(54) TOPIC CLUSTERING TO GENERATE FORMULATIONS

(71) Applicant: INTERNATIONAL BUSINESS MACHINES CORPORATION, Armonk, NY (US)

(72) Inventors: Hiroki Yanagisawa, Tokyo (JP); Yachiko Obara, Tokyo (JP); Takashi Imamichi, Kanagawa (JP); Tetsuro Morimura, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 16/274,815

(22) Filed: Feb. 13, 2019

(65) Prior Publication Data
US 2020/0257727 A1    Aug. 13, 2020

(51) Int. Cl.
*G06F 16/906* (2019.01)
*G06F 9/50* (2006.01)
*G06F 16/9032* (2019.01)

(52) U.S. Cl.
CPC .......... *G06F 16/906* (2019.01); *G06F 9/5033* (2013.01); *G06F 16/90332* (2019.01)

(58) Field of Classification Search
CPC .............................. G06F 16/906; G06F 9/5033
USPC ........................................................ 707/737
See application file for complete search history.

(56) References Cited

U.S. PATENT DOCUMENTS

| | | | | |
|---|---|---|---|---|
| 6,757,667 B1 * | 6/2004 | Patel | ...................... | G16B 40/00 707/602 |
| 7,375,062 B1 * | 5/2008 | Narula | ..................... | C07C 33/14 510/104 |
| 7,531,489 B2 * | 5/2009 | Narula | ................... | C07C 33/025 510/107 |
| 7,716,169 B2 * | 5/2010 | Park | ........................ | G16B 40/00 707/602 |
| 8,412,579 B2 * | 4/2013 | Gonzalez | ............... | G06Q 30/06 705/15 |
| 8,785,677 B1 * | 7/2014 | Narula | ..................... | C07C 69/56 560/205 |
| 9,519,620 B1 * | 12/2016 | Pinel | ....................... | G06F 16/34 |

(Continued)

FOREIGN PATENT DOCUMENTS

| WO | WO2011013140 | | 2/2011 | |
|---|---|---|---|---|
| WO | WO-2011013140 A1 * | | 2/2011 | ............. G06Q 30/02 |
| WO | WO2017023154 | | 2/2017 | |

*Primary Examiner* — Phuong Thao Cao
(74) *Attorney, Agent, or Firm* — Tutunjian & Bitetto, P.C.; Randall Bluestone

(57) ABSTRACT

A computer-implemented method is provided for generating a new formulation. The method includes dividing each of input formulations into constituent topics, based on analysis results for an analysis of the input formulations using a topic model algorithm. The method further incudes includes receiving an input query that specifies a set of fragrance. notes to he used to generate the new formulation, The method also includes choosing one of the input formulations which includes the set of fragrance notes to be used to generate the new formulation. The method additionally includes clustering the constituent topics of the chosen one of the input formulations based on a similarity metric. The method further includes generating the new formulation as a response to the input query by selecting, from the input formulations, materials for each of the clustered ones of the constituent topics.

20 Claims, 6 Drawing Sheets

(56) References Cited

U.S. PATENT DOCUMENTS

| | | | |
|---|---|---|---|
| 9,758,467 B2* | 9/2017 | Amorelli | A61Q 5/00 |
| 10,308,895 B2* | 6/2019 | Vidal | C11B 9/0019 |
| 2003/0134033 A1 | 7/2003 | Holguin et al. | |
| 2004/0083083 A1 | 4/2004 | Doganaksoy et al. | |
| 2010/0115492 A1* | 5/2010 | Yoshimura | G06F 8/36 |
| | | | 717/120 |
| 2010/0226871 A1* | 9/2010 | Fraser | C11B 9/0015 |
| | | | 424/70.6 |
| 2011/0295400 A1* | 12/2011 | Samain | G06Q 10/06 |
| | | | 700/97 |
| 2013/0149679 A1* | 6/2013 | Tokuda | G09B 19/0092 |
| | | | 434/127 |
| 2014/0006159 A1* | 1/2014 | Wissner-Gross | |
| | | | G06Q 30/0261 |
| | | | 705/14.57 |
| 2015/0120492 A1* | 4/2015 | Somerville | G06Q 30/0631 |
| | | | 705/26.5 |
| 2015/0161912 A1* | 6/2015 | Bhattacharjya | G06Q 50/12 |
| | | | 434/127 |
| 2016/0055559 A1* | 2/2016 | Heck | G06Q 30/0621 |
| | | | 705/26.5 |
| 2017/0116580 A1* | 4/2017 | Kim | G06Q 10/1095 |
| 2017/0139902 A1* | 5/2017 | Byron | G06Q 10/087 |
| 2017/0228364 A1* | 8/2017 | Byron | G06F 40/253 |
| 2018/0114284 A1* | 4/2018 | Greenberger | G06Q 30/0282 |
| 2018/0165620 A1* | 6/2018 | Ross | G01G 19/4146 |
| 2019/0018821 A1* | 1/2019 | Ormont | G06N 20/00 |
| 2019/0136148 A1* | 5/2019 | Holscher | A61Q 19/10 |
| 2019/0213487 A1* | 7/2019 | Gschwind | G06N 3/08 |
| 2019/0385730 A1* | 12/2019 | Baugh | G16H 50/30 |
| 2020/0257727 A1* | 8/2020 | Yanagisawa | G06F 16/90332 |

* cited by examiner

TOPIC CLUSTERING TO GENERATE FORMULATIONS

BACKGROUND

Technical Field

The present invention generally relates to formulations, and more particularly to topic clustering to generate formulations.

Description of the Related Art

A perfume is typically composed of approximately 40 materials which are selected from a set of approximately 1000 materials. The term "formulation" refers to the set of materials used in the perfume, i.e., its constituent materials. The term "fragrance note" refers to a label (e.g., JASMINE, ROSE, etc.) for a particular formulation, i.e., a particular set of materials. The set of materials in a particular formulation can be divided into topics by using topic modeling.

Some combination of materials in a formulation constitute a JASMINE fragrance note, and another combination of materials constitute a ROSE fragrance note. Note that some materials can be used both for JASMINE and ROSE fragrance notes, and that there are many combinations of materials that constitute a JASMINE fragrance note.

The materials in formulations can be classified by analyzing the set of formulations using a topic model algorithm such as LDA (Latent Dirichlet Allocation). However, while topic model algorithms such as LDA are usable for formulation generation, the results of such topic models tend to be fragmented. Accordingly, there is a need for an improved approach to generating formulations.

SUMMARY

According to an aspect of the present invention, a computer-implemented method is provided for generating a new formulation. The method includes dividing, by a hardware processor, each of input formulations into constituent topics, based on analysis results for an analysis of the input formulations using a topic model algorithm. The method further includes receiving, by the hardware processor, an input query that specifies a set of fragrance notes to be used to generate the new formulation. The method also includes choosing, by the hardware processor, one of the input formulations which includes the set of fragrance notes to be used to generate the new formulation. The method additionally includes clustering, by the hardware processor, the constituent topics of the chosen one of the input formulations based on a similarity metric. The method further includes generating, by the hardware processor, the new formulation as a response to the input query by selecting, from the input formulations, materials for each of the clustered ones of the constituent topics.

According to another aspect of the present invention, a computer program product is provided for generating a new formulation. The computer program product includes a non-transitory computer readable storage medium having program instructions embodied therewith. The program instructions are executable by a computer to cause the computer to perform a method. The method includes dividing, by a hardware processor, each of input formulations into constituent topics, based on analysis results for an analysis of the input formulations using a topic model algorithm. The method further includes receiving, by the hardware processor, an input query that specifies a set of fragrance notes to be used to generate the new formulation. The method also includes choosing, by the hardware processor, one of the input formulations which includes the set of fragrance notes to be used to generate the new formulation. The method additionally includes clustering, by the hardware processor, the constituent topics of the chosen one of the input formulations based on a similarity metric. The method further includes generating, by the hardware processor, the new formulation as a response to the input query by selecting, from the input formulations, materials for each of the clustered ones of the constituent topics.

According to yet another aspect of the present invention, a computer processing system is provided for generating a new formulation. The computer processing system includes a memory for storing program code. The computer processing system further includes a processor for running the program code to divide each of input formulations into constituent topics, based on analysis results for an analysis of the input formulations using a topic model algorithm. The processor further runs the program code to receive an input query that specifies a set of fragrance notes to be used to generate the new formulation. The processor also runs the program code to choose one of the input formulations which includes the set of fragrance notes to be used to generate the new formulation. The processor additionally runs the program code to cluster the constituent topics of the chosen one of the input formulations based on a similarity metric. The processor further runs the program code to generate the new formulation as a response to the input query by selecting, from the input formulations, materials for each of the clustered ones of the constituent topics.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to topic clustering to generate formulations.

As noted above, while topic model algorithms such as LDA are usable for formulation generation, the results of such topic models tend to be fragmented. Advantageously, the present invention clusters the fragmented topics in order to generate new formulations.

In an embodiment, the present invention can generate a new formulation by utilizing the results of a topic model, given fragrance notes as a query.

In an embodiment relating to an ideal case, a new formulation can be created by identifying a topic that corresponds to each fragrance note. For example, if we want to generate a new formulation with JASMINE and APPLE notes, the topics that correspond to these two notes are identified and some sets of materials from the topics are selected. However, in reality, the results of the topic model tend to be fragmented, and the relationship between the topics and fragrance notes cannot be identified. Accordingly, the present invention provides an approach to generate a new formulation, which works even if the results of the topic model are fragmented and the relationship between topics and fragrance notes are unclear.

Figure 1:
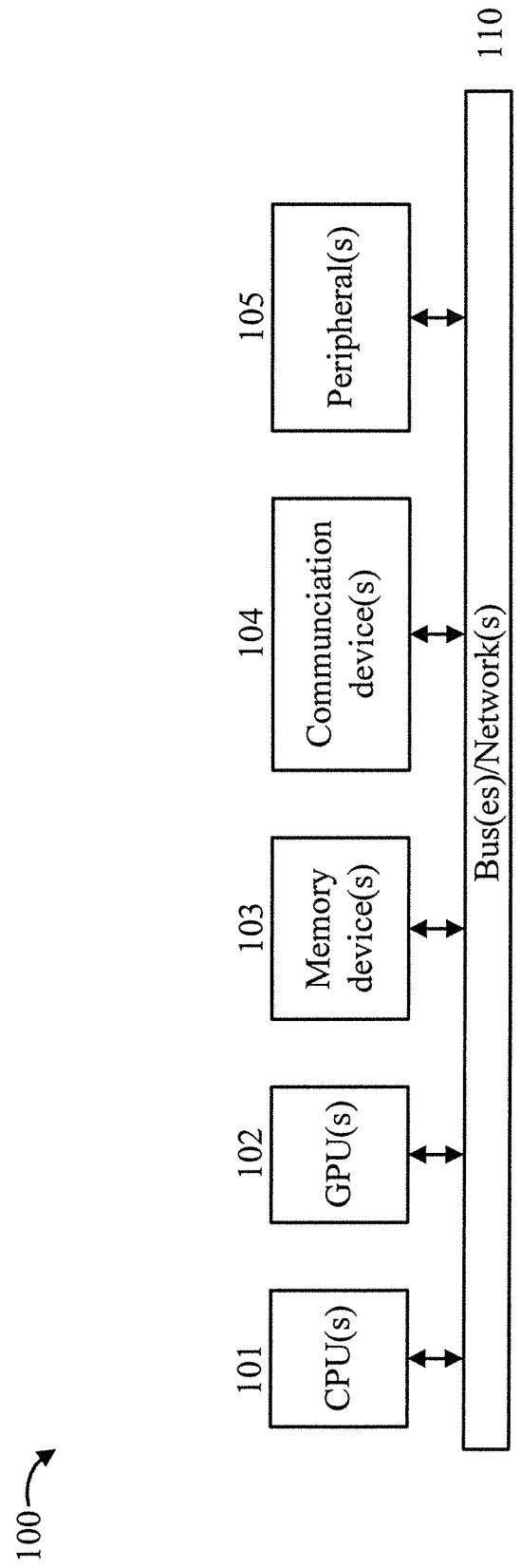
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system in a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration (see FIGS. 5-6) can be used. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
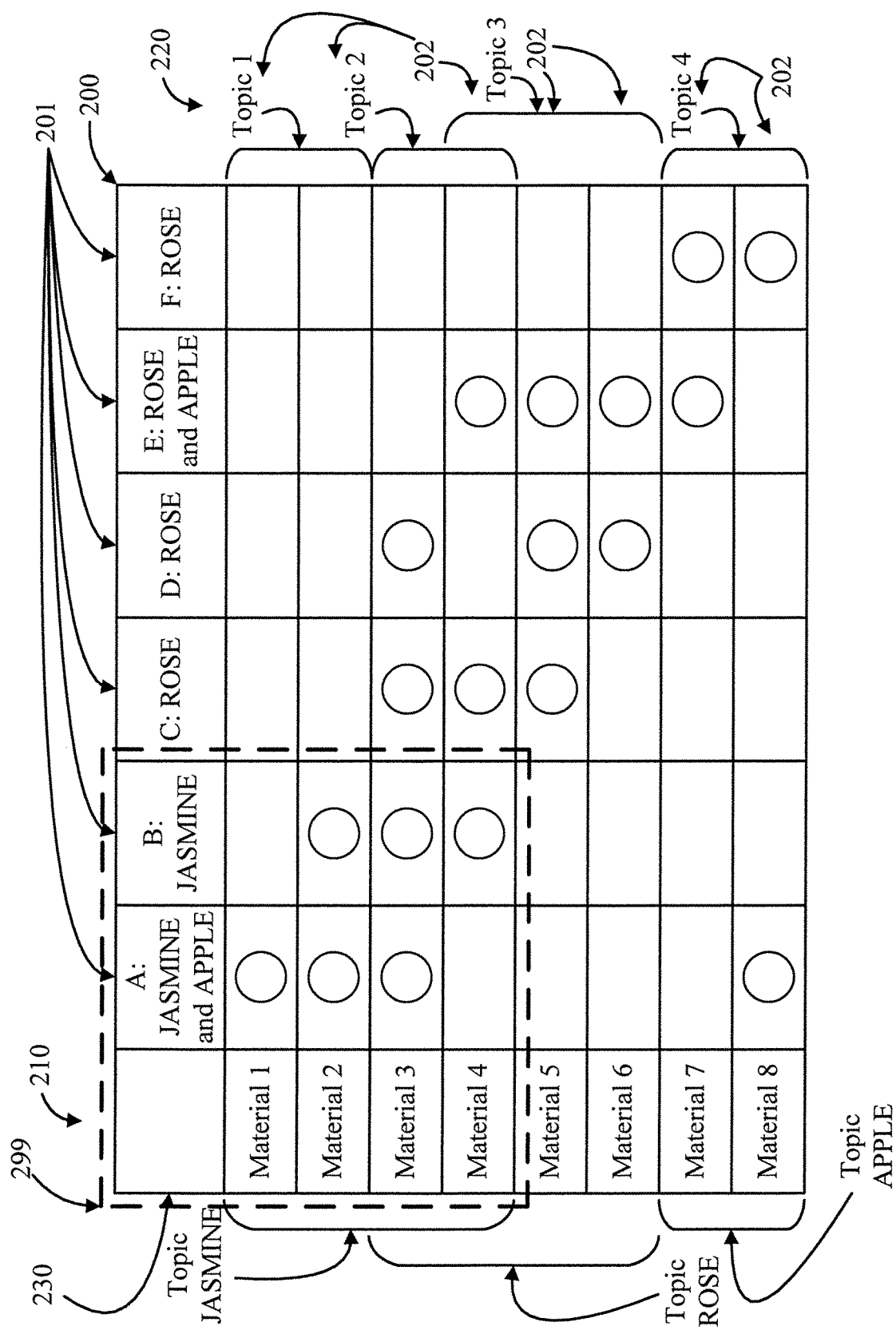
FIG. 2 is a diagram showing a chart of materials and topics pertaining to various notes, in accordance with an embodiment of the present invention.

FIG. 2 is a diagram showing a chart 200 of materials 210 and topics 220 pertaining to various notes 230, in accordance with an embodiment of the present invention.

Each of the columns 201 corresponds to a respective formulation with a fragrance note or combination of fragrance notes (from formulation A through formulation F). Each of the rows 202 corresponds to a respective material (from material 1 through material 8). The various topics 220 are shown relative to the materials 210 and formulations 230. A circle in a box in a particular row means that the corresponding material 210 from that particular row can be found present in the formulation in the column intersecting that particular row.

It is to be appreciated that the topics on the left, namely, JASMINE, ROSE, AND APPLE, correspond to an ideal (non-fragmented) case. In contrast, the topics on the right, namely 1, 2, 3, and 4, correspond to a non-ideal (fragmented LDA result) case.

Regarding block 299, which represents a portion of chart 200, when we choose materials from a large topic JASMINE or small topics 1 and 2, we prefer choosing an existing combination of materials from the large topic rather than choosing materials independently from the small topics (i.e., we prefer materials $\{1, 2, 3\}$ or $\{2, 3, 4\}$ to other combinations such as $\{1, 2, 4\}$).

Figure 3:
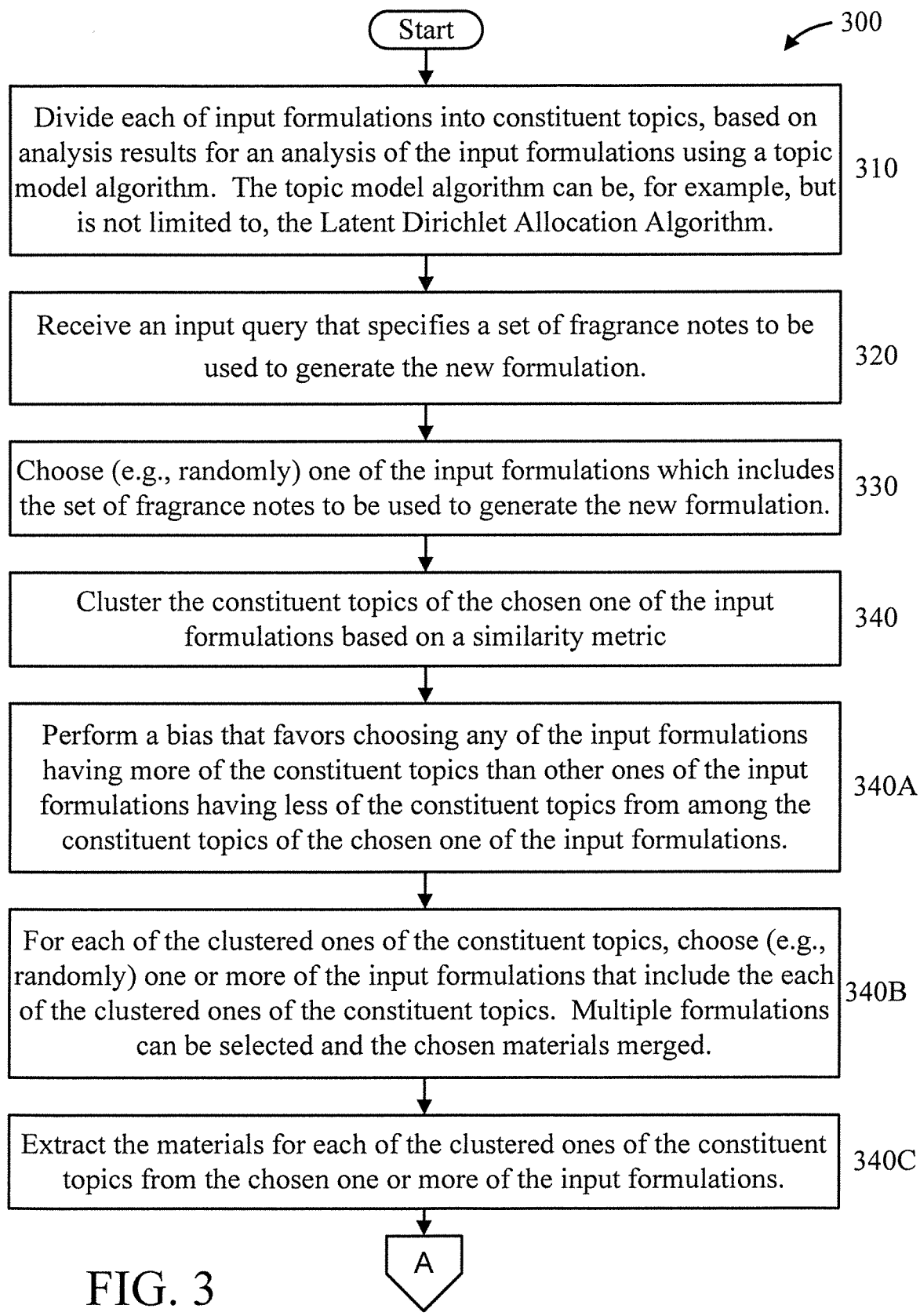
FIGS. 3-4 are flow diagrams showing an exemplary method for generating formulations using topic clustering, in accordance with an embodiment of the present invention.
Figure 4:
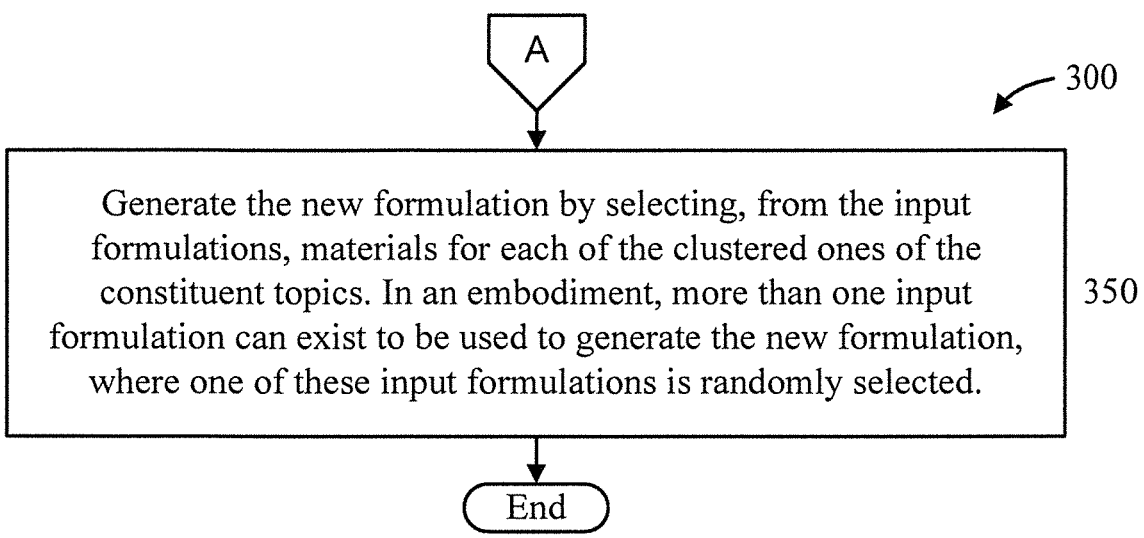

FIGS. 3-4 are flow diagrams showing an exemplary method 300 for generating formulations using topic clustering, in accordance with an embodiment of the present invention.

At block 310, divide each of input formulations into constituent topics, based on analysis results for an analysis of the input formulations using a topic model algorithm. In an embodiment, the topic model algorithm can be, for example, but is not limited to, the Latent Dirichlet Allocation Algorithm. In an embodiment, block 310 can be as a pre-processing step of the method 300.

At block 320, receive an input query that specifies a set of fragrance notes to be used to generate the new formulation.

At block 330, choose one of the input formulations which includes the set of fragrance notes to be used to generate the new formulation. It is preferable to choose the formulation which includes all the set of fragrance notes, but not limited to (especially if there is no such formulation in the input). In an embodiment, the chosen one of the input formulations is chosen randomly.

At block 340, cluster the constituent topics of the chosen one of the input formulations based on a similarity metric.

In an embodiment, block 340 can include one or more of blocks 340A-340C.

At block 340A, perform a bias that favors choosing any of the input formulations having more of the constituent topics than other ones of the input formulations having less of the constituent topics from among the constituent topics of the chosen one of the input formulations.

At block 340B, for each of the clustered ones of the constituent topics, choose one or more of the input formulations that include the each of the clustered ones of the constituent topics. In an embodiment, choosing of the one or more input formulations can be performed in a random manner. In an embodiment, multiple formulations can be selected and the chosen materials merged.

At block 340C, extract the materials for each of the clustered ones of the constituent topics from the chosen one or more of the input formulations.

At block 350, generate the new formulation by selecting, from the input formulations, materials for each of the clustered ones of the constituent topics. In an embodiment, more than one input formulation can exist to be used to generate the new formulation, where one of these input formulations is randomly selected.

Regarding block 350, if the number of material chosen from each topic is desired to be reduced, then randomly select a subset of the chosen materials.

A further description will now be given regarding block 340, in accordance with various embodiments of the present invention.

In block 340, any clustering algorithm can be used with any metric. In an embodiment, the affinity propagation algorithm is used with a similarity metric in which the topics that are likely to appear together in a single formulation have a high similarity value. Of course, other clustering algorithms can be used including, but not limited to, k-means and an agglomerative algorithm. In addition, in an embodiment, another similarity metric can be used in which topics with similar material distributions (which is an output of LDA) have a high similarity value, and any other similarity metrics. These and other variations are readily determined by one of ordinary skill in the art given the teachings of the present invention provided herein, while maintaining the spirit of the present invention.

A further description will now be given regarding various aspects of the present invention, in accordance with various embodiments of the present invention.

In an experiment, new formulations were generated by using our invention several tens of thousands times, where 4-5 good formulations were selected from the generated formulations. One of the criteria to select good formulations can be that a good formulation should not include any pair (or any tuple) of materials that does not appear in the dataset (the formulations). This extension can strengthen our invention, because the extension is aligned with our purpose of avoiding unnatural combinations of materials in the generated formulations.

In an embodiment, the present invention can be implemented using a cloud configuration.

Perfume manufacturers, medicine manufacturers, pharmacies or other entities can send queries regarding medicine formulations, where they can submit, in the query, elements they have in stock in order to get an equivalent formulation relative to an initial formulation where some elements of the initial formulation are not in stock but the equivalent formulation with in stock elements is essentially equivalent (e.g., in efficacy, etc.). In this way, waiting for restocking can be avoided. These and other applications and operational environments are readily contemplated by one of ordinary skill in the art given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
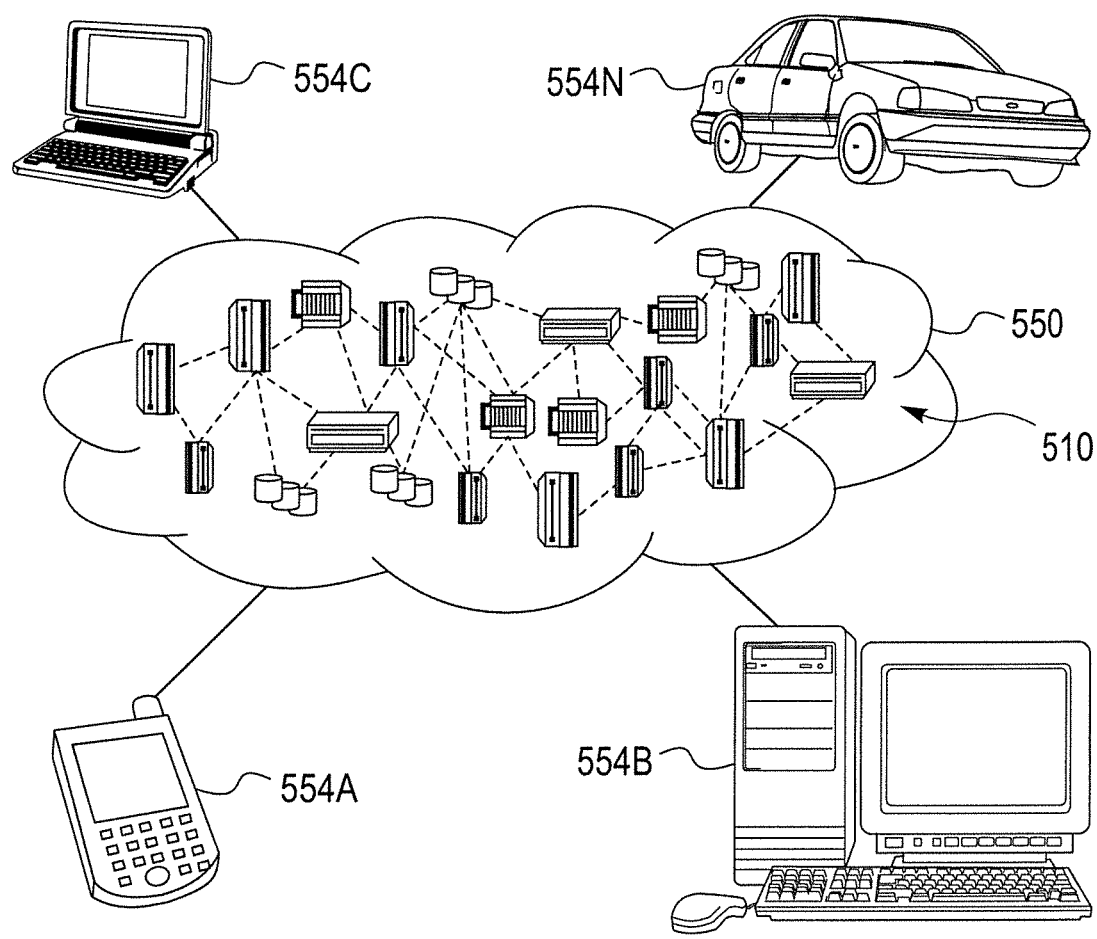
FIG. 5 is a block diagram showing an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
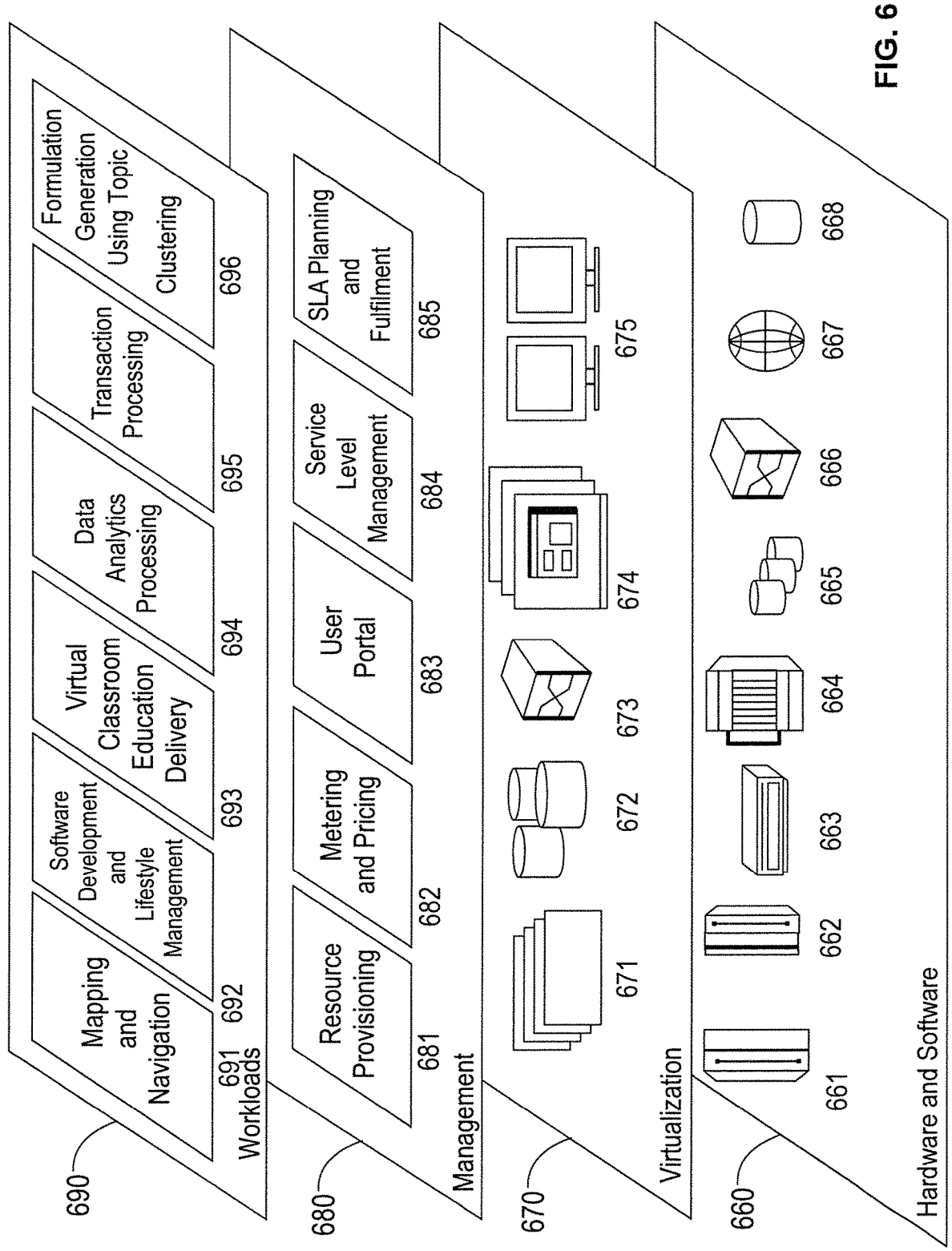
FIG. 6 is a block diagram showing a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and formulation generating by topic clustering 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for generating a new formulation, comprising:
    dividing, by a hardware processor, each of input formulations into constituent topics, based on analysis results for an analysis of the input formulations using a topic model algorithm;
    receiving, by the hardware processor, an input query that specifies a set of fragrance notes to be used to generate the new formulation;

choosing, by the hardware processor, one of the input formulations which includes the set of fragrance notes to be used to generate the new formulation;

clustering, by the hardware processor, the constituent topics of the chosen one of the input formulations based on a similarity metric; and generating, by the hardware processor, the new formulation as a response to the input query by selecting, from the input formulations, materials for each of the clustered ones of the constituent topics.

2. The computer-implemented method of claim 1, wherein the topic model algorithm is the Latent Dirichlet Allocation Algorithm.

3. The computer-implemented method of claim 1, wherein said analyzing step is performed as a pre-processing step of the method.

4. The computer-implemented method of claim 1, wherein said choosing step chooses the one of the input formulations, which includes at least the set of fragrance notes to be used to generate the new formulation, randomly from the input formulations.

5. The computer-implemented method of claim 4, wherein the input formulations comprise at least two input formulations which include the set of fragrance notes to be used to generate the new formulation, one of which is randomly chosen by said choosing step.

6. The computer-implemented method of claim 1, where said choosing step comprises:
for each of the clustered ones of the constituent topics, choosing one or more of the input formulations that include the each of the clustered ones of the constituent topics; and
extracting the materials for each of the clustered ones of the constituent topics from the chosen one or more of the input formulations.

7. The computer-implemented method of claim 1, wherein said choosing step is biased to favor choosing any of the input formulations having more of the constituent topics than other ones of the input formulations having less of the constituent topics from among the constituent topics of the chosen one of the input formulations.

8. The computer-implemented method of claim 1, wherein said clustering step is performed using an affinity propagation algorithm with the similarity metric.

9. The computer-implemented method of claim 1, further comprising reducing a number of the materials selected for each of the clustered ones of the constituent topics by selecting only a subset of the materials in said selecting step.

10. The computer-implemented method of claim 1, wherein said selecting step is biased to exclude pairs of the materials that are unpaired in any of the input formulations.

11. The computer-implemented method of claim 1, further comprising manufacturing the new formulation.

12. A computer program product for generating a new formulation, the computer program product comprising a non-transitory computer readable storage medium having program instructions embodied therewith, the program instructions executable by a computer to cause the computer to perform a method comprising:
dividing, by a hardware processor, each of input formulations into constituent topics, based on analysis results for an analysis of the input formulations using a topic model algorithm;
receiving, by the hardware processor, an input query that specifies a set of fragrance notes to he used to generate the new formulation;
choosing, by the hardware processor, one of the input formulations which includes the set of fragrance notes to be used to generate the new formulation;
clustering, by the hardware processor, the constituent topics of the chosen one of the input formulations based on a similarity metric; and
generating, by the hardware processor, the new formulation as a response to the input query by selecting, from the input formulations, materials for each of the clustered ones of the constituent topics.

13. The computer program product of claim 12, wherein the topic model algorithm is the Latent Dirichlet Allocation Algorithm.

14. The computer program product of claim 12, wherein said analyzing step is performed as a pre-processing step of the method.

15. The computer program product of claim 12, wherein said choosing step chooses the one of the input formulations, which includes at least the set of fragrance notes to be used to generate the new formulation, randomly from the input formulations.

16. The computer program product of claim 15, wherein the input formulations comprise at least two input formulations which include the set of fragrance notes to be used to generate the new formulation, one of which is randomly chosen by said choosing step.

17. The computer program product of claim 12, where said choosing step comprises:
for each of the clustered ones of the constituent topics, choosing one or more of the input formulations that include the each of the clustered ones of the constituent topics; and
extracting the materials for each of the clustered ones of the constituent topics from the chosen one or more of the input formulations.

18. The computer program product of claim 12, wherein said choosing step is biased to favor choosing any of the input formulations having more of the constituent topics than other ones of the input formulations having less of the constituent topics from among the constituent topics of the chosen one of the input formulations.

19. The computer program product of claim 12, wherein said clustering step is performed using an affinity propagation algorithm with the similarity metric.

20. A computer processing system for generating a new formulation, comprising:
a memory for storing program code; and
a processor for running the program code to
divide each of input formulations into constituent topics, based on analysis results for an analysis of the input formulations using a topic model algorithm;
receive an input query that specifies a set of fragrance notes to be used to generate the new formulation;
choose one of the input formulations which includes the set of fragrance notes to be used to generate the new formulation;
cluster the constituent topics of the chosen one of the input formulations based on a similarity metric; and
generate the new formulation as a response to the input query by selecting, from the input formulations, materials for each of the clustered ones of the constituent topics.

* * * * *